B. F. & J. MARTZ.
SHOCK ABSORBER.
APPLICATION FILED OCT. 8, 1915.
1,205,373.
Patented Nov. 21, 1916.
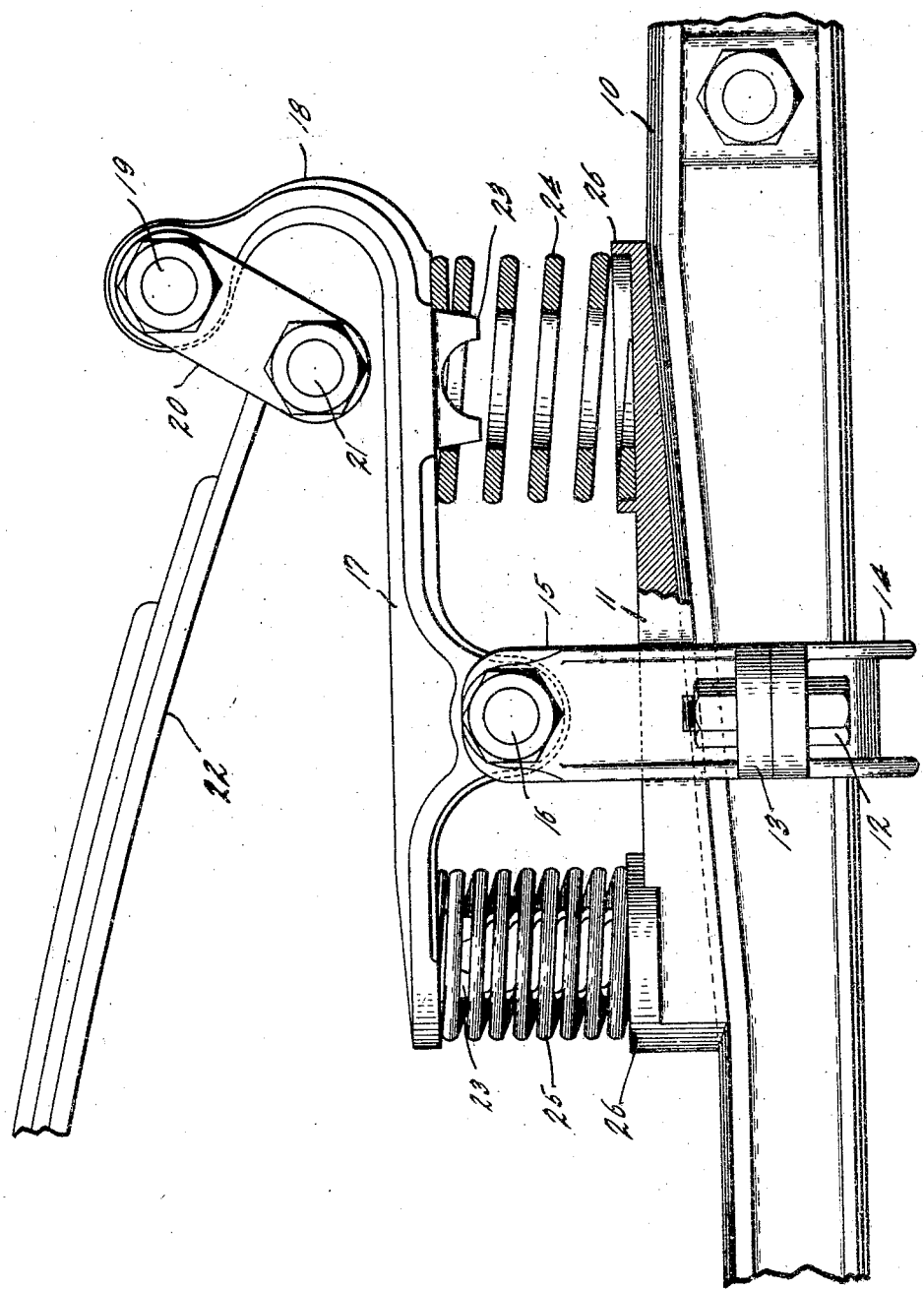
WITNESS
Frank A. Fahle
INVENTORS
Benjamin F. Martz, and
Joseph Martz.
BY
ATTORNEYS

UNITED STATES PATENT OFFICE.

BENJAMIN F. MARTZ AND JOSEPH MARTZ, OF INDIANAPOLIS, INDIANA.

SHOCK-ABSORBER.

1,205,373.  Specification of Letters Patent.  Patented Nov. 21, 1916.

Application filed October 8, 1915. Serial No. 54,705.

*To all whom it may concern:*

Be it known that we, BENJAMIN F. MARTZ and JOSEPH MARTZ, citizens of the United States, residing at Indianapolis, in the county of Marion and State of Indiana, have invented a new and useful Shock-Absorber, of which the following is a specification.

It is the object of our invention to provide an effective, simple, and inexpensive shock absorber, and one capable of taking care of the rebound as well as of the direct shock.

In carrying out our invention, we provide a lever which is pivotally mounted on the axle and pivotally connected to the vehicle body, preferably to the main vehicle spring, and which is acted on on the two sides of its pivot by two springs which are stressed alternately as the vehicle body rises and falls relatively to the axle.

The single figure of the drawing is an elevation, in partial section, of a shock absorber embodying our invention, showing its connection to the vehicle axle and the main vehicle spring.

On the vehicle axle 10 is fastened a bed plate 11, as by means of clamping bolts 12 which pass through ears 13 on such bed plate 11 and a coöperating clamping yoke 14. The bed plate 11 is provided at an intermediate point with an upstanding post 15, which at its upper end carries a pivot pin 16 on which is mounted a lever 17 which extends in both directions from its pivotal point, preferably in the same vertical plane as the axle 10. One projecting end 18 of the lever 17 is curved upward and somewhat backward, and at its upper end carries a pivot pin 19 on which is pivoted a depending link 20 which at its lower end is connected by a pivot pin 21 to the end of the main vehicle spring 22, which is also in the same vertical plane as the axle 10. The under sides of the two projecting ends of the lever 17 are provided with downwardly projecting fingers or bosses 23, which project into the upper ends of helical compression springs 24 and 25 the lower ends of which springs rest in cups 26 on the upper face of the bed plate 11.

In operation, the two springs 24 and 25 are both normally under some compression, and balance each other in part, though the spring 24 also carries its share of the weight of the vehicle body, so that it is stronger than is the spring 25. Either of the springs 24 or 25 may be in duplicate. When a rut or a ridge in the road is encountered, and a relative vertical movement between the axle 10 and the vehicle body is produced, the spring 24 is compressed as the vehicle body including the spring 22 moves downward toward the axle 10, the spring 25 at the same time expanding; and the spring 25 is compressed as the vehicle body including the spring 22 moves upward relative to the axle 10, the spring 24 at the same time expanding. This alternate compression of the springs 24 and 25 is produced by the rocking of the lever 17 on the pivot pin 16, and effectively cushions not only the direct shock but the rebound. The bending of the main vehicle spring 22 is not at all interfered with by the rocking of the lever 17, because the link 20 permits the end of the spring 22 to move horizontally relatively to the bent end 18 of such lever.

We claim as our invention:

1. A shock absorber, comprising a bed plate provided with means for clamping it to an axle, a lever pivotally mounted on said bed plate and extending in both directions from its pivotal point, a spring between each projecting end of such lever and the bed plate, said two springs tending to turn the lever in opposite directions, and a link pivotally mounted at one end on one projecting end of said lever and provided at the other end with means for direct pivotal attachment to the main vehicle spring.

2. A shock absorber, comprising a support, a lever pivoted at an intermediate point on said support and provided at one projecting end with an attaching device, a spring acting between said support and said lever on each side of the pivotal point of the lever, said two springs tending to move the lever in opposite directions, and a link pivotally mounted at one end on one projecting end of said lever and provided at the other end with means for attachment to the other of the two relatively movable parts connected by the shock absorber from that which carries said support.

3. A shock absorber, comprising a bed plate provided with means for clamping it to an axle, a lever pivotally mounted on said bed plate and provided with two arms, a spring between each of said arms and the bed plate, said two springs tending to turn the lever in opposite directions about its pivot, and a link pivotally connected at one end to one of said arms and provided at the other end with means for direct pivotal attachment to the main vehicle spring.

4. A shock absorber, comprising a support, a lever pivotally mounted on said support and having two arms, one of said arms being provided with an attaching device, and a spring acting between each of said arms and said support, said two springs tending to move the lever in opposite directions, and a link pivotally connected at one end to one of said arms and provided at the other end with means for attachment to the other of the two relatively movable parts connected by the shock absorber from that which carries said support.

In witness whereof we have hereunto set our hands at Indianapolis, Indiana, this 4th day of October, A. D. one thousand nine hundred and fifteen.

BENJAMIN F. MARTZ.
JOSEPH MARTZ.